United States Patent
Ito et al.

(10) Patent No.: US 6,229,965 B1
(45) Date of Patent: May 8, 2001

(54) APPARATUS SUCH AS CAMERA ADAPTED FOR FILM HAVING MAGNETIC RECORDING PART

(75) Inventors: Kenji Ito; Takanori Honda, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/050,581

(22) Filed: Mar. 30, 1998

(30) Foreign Application Priority Data

| Apr. 3, 1997 | (JP) | 9-085081 |
| May 20, 1997 | (JP) | 9-129791 |
| Mar. 13, 1998 | (JP) | 10-062903 |
| Mar. 13, 1998 | (JP) | 10-062904 |

(51) Int. Cl.[7] .................................... G03B 17/24
(52) U.S. Cl. .................. 396/319; 396/418; 396/535; 396/539
(58) Field of Search ................... 396/310, 312, 396/319, 320, 535, 539, 418; 360/126, 137

(56) References Cited

U.S. PATENT DOCUMENTS

| 4,996,546 | * | 2/1991 | Pagano et al. | 396/319 |
| 5,005,031 | * | 4/1991 | Kelbe | 396/320 |
| 5,097,278 | * | 3/1992 | Tamamura et al. | 396/320 |
| 5,155,511 | * | 10/1992 | Tamamura | 396/320 |
| 5,307,100 | * | 4/1994 | Kubo | 396/319 |
| 5,321,452 | * | 6/1994 | Tsujimoto | 396/311 |
| 5,701,531 | * | 12/1997 | Tanaka et al. | 396/319 |
| 5,752,110 | * | 5/1998 | Iijima et al. | 396/319 |
| 5,857,123 | * | 1/1999 | Miyamoto et al. | 396/319 |

FOREIGN PATENT DOCUMENTS

| 7-209733 | * | 8/1995 | (JP) . |
| 8-160521 | * | 6/1996 | (JP) . |

* cited by examiner

*Primary Examiner*—David M. Gray
(74) *Attorney, Agent, or Firm*—Robin, Blecker & Daley

(57) ABSTRACT

An apparatus, such as a camera, adapted for a film having a magnetic recording part, includes a magnetic head which at least reads information from the magnetic recording part of the film, a pad which brings the film close to the magnetic head, a pad support part which supports the pad, and a magnetic shield member disposed between the pad and the pad support part.

12 Claims, 6 Drawing Sheets

APPARATUS SUCH AS CAMERA ADAPTED FOR FILM HAVING MAGNETIC RECORDING PART

BACKGROUND OF THE INVENTION

1. Field of the Invention

The present invention relates to an optical apparatus such as a camera adapted for use of a film of the kind having a magnetic recording part, and more particularly to measures against magnetic noise applied to a magnetic head of the optical apparatus.

2. Description of Related Art

The photographic film of the kind having a magnetic recording layer formed on the base surface side thereof has become practically usable. A camera arranged to magnetically record information of varied kinds at each of phototaking frames of the film of the above-stated kind was disclosed in U.S. Pat. No. 4,878,075, etc. For the photographic film of this kind, another camera has been developed to have a reloading function. According to the reloading function, in a case where the film has been reloaded on the same or some other camera after the use of the film is suspended by rewinding the film halfway before it is completely used, magnetic information recorded on the film is read by a magnetic head (magnetic reading means) disposed within the camera, so that a photo-taking operation on the same film from an unexposed (unused) frame part thereof can be resumed automatically.

In the meantime, the magnetic recording layer of the photographic film is formed to cover the whole film including photo-taking areas. However, the magnetic material of the magnetic layer is applied to the film in a very small quantity so as to prevent any adverse effect on picture quality. Therefore, the filling rate of the magnetic material is very small to give only a very small output of the magnetic head in reading the magnetic information recorded on the film.

It is, on the other hand, important for the magnetic reading device of a camera using the photographic film of the above-stated kind, to be compact in size. With the magnetic reading device compactly arranged within the camera, however, a magnetic noise generating source, such as a film transport motor, is disposed close to the magnetic head of the magnetic reading device. In many cases, the magnetic noise generating source thus imparts an induced noise component to the reading output of the magnetic head. As a result, the S/N ratio of the reading output is deteriorated to hinder the magnetic information from being accurately read by the magnetic reading device.

Cameras of the kind having the above-stated film reloading function are mostly arranged to make a check for the presence or absence of the record of magnetic information for every one of photo-taking frames and to determine each frame to be "exposed" when the frame is found to have the magnetic information. However, in a case where the induced noise component is large as compared with the reading output expected, detection of such a large induced noise component tends to cause an unexposed frame to be mistaken for an exposed frame. In such a case, the film reloading function cannot be adequately carried out.

To solve this problem, an arrangement has been proposed as disclosed in Japanese Laid-Open Patent Application No. HEI 4-22937, in which in order to lessen the adverse effect of an induced noise due to a film transport motor, a magnetic head is disposed in a specific direction with respect to the rotating shaft of the motor, because magnetism generated by the motor becomes less in that specific direction.

In connection with the above-stated problem, another arrangement has been proposed as disclosed in Japanese Laid-Open Patent Application No. HEI 5-34798, in which magnetism coming from a film transport motor is lessened by encompassing the motor with a magnetic shield member which is made of a suitable material. In the case of this disclosure, a soft magnetic material such as permalloy is employed as the magnetic shield member.

Another method has been proposed as disclosed in Japanese Laid-Open Patent Application No. HEI 4-32086, as a solution of the above-stated problem. According to this method, the adverse effect of magnetism coming from a motor is lessened by arranging a magnetic shield member either in front or in rear of a magnetic head.

A further method has been proposed as disclosed in connection with this problem in Japanese Laid-Open Patent Application No. HEI 6-332064. According to that method, an adverse effect of a leakage magnetic flux from a film transport motor on magnetic information recorded on the film is prevented by making, from a magnetic material, a film take-up spool with which to encompass the film transport motor.

However, these prior methods have presented the following problems. The induced noise generated at the magnetic head by the film transport motor cannot be sufficiently removed. In order to sufficiently attain the effect of these methods, the shield member must be arranged to have a large thickness and also to have a large area. However, such arrangement results in an increase in size of the magnetic reading device.

BRIEF SUMMARY OF THE INVENTION

In accordance with an aspect of the invention, there is provided an apparatus, such as a camera, adapted for a film having a magnetic recording part, which comprises a magnetic head which at least reads information from the magnetic recording part of the film, a pad which brings the film close to the magnetic head, a pad support part which supports the pad, and a magnetic shield member disposed between the pad and the pad support part, so that the adverse effect of magnetic noise of a motor, etc., on the magnetic head can be effectively removed with a compact structure.

In accordance with another aspect of the invention, there is provided an apparatus, such as a camera, adapted for a film having a magnetic recording part, which comprises a magnetic head which at least reads information from the magnetic recording part of the film, a noise source, such as a motor, and a magnetic shield member provided on a structural member which is opposed to a terminal part of the noise source and which is not directly related to the noise source, so that the adverse effect of magnetic noise of the motor, etc., on the magnetic head can be effectively removed with a compact structure.

These and other aspects of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 4:
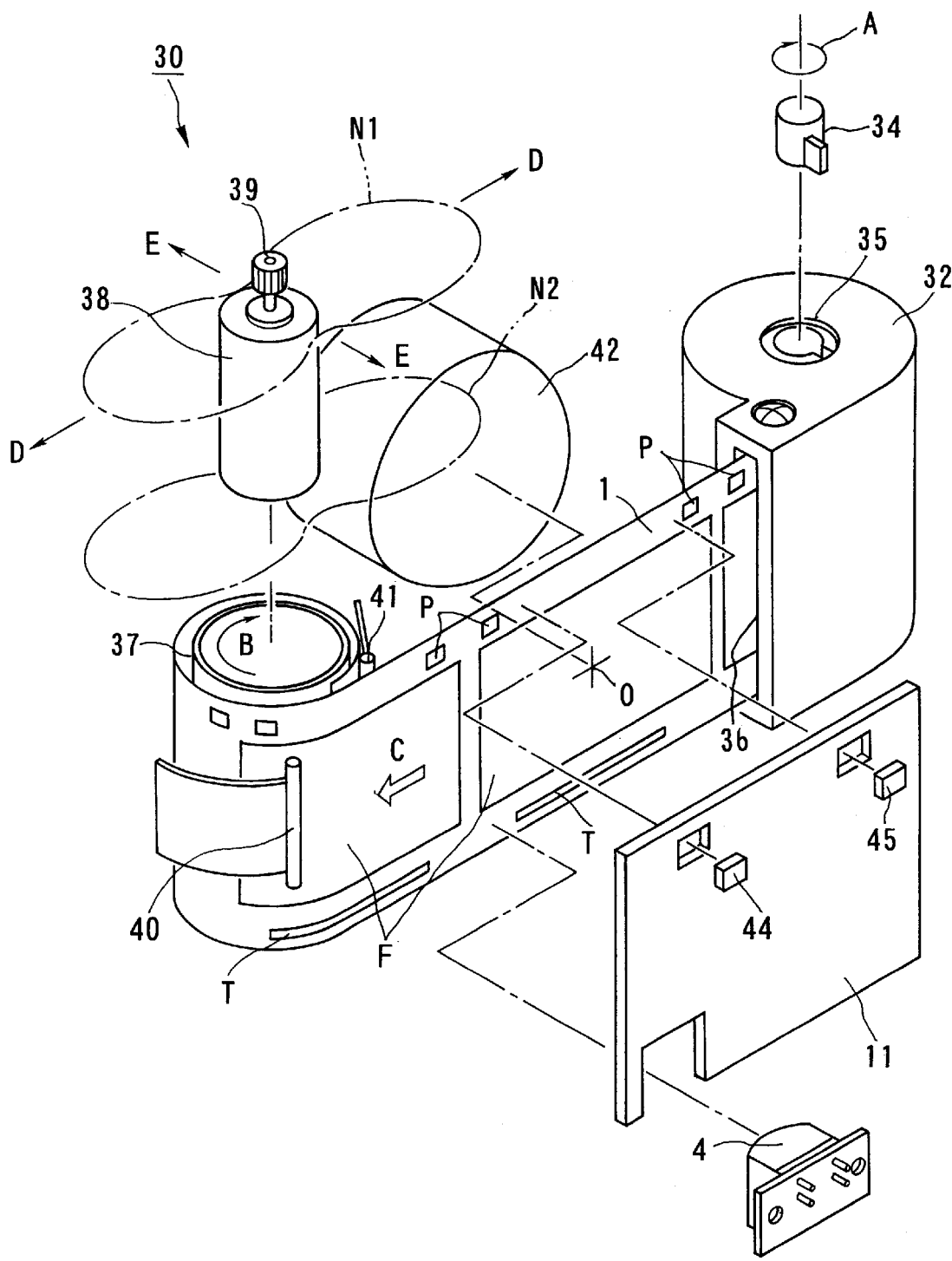
FIG. 4 is an exploded perspective view showing the internal arrangement of the camera of each of the first, second and third embodiments of the invention.

FIG. 4 shows the internal structural arrangement of a camera 30 which is provided with a magnetic recording and reproducing device according to a first embodiment of the invention. Referring to FIG. 4, a film 1 is provided with a magnetic recording layer which is formed on the base side of the film 1. A film cartridge 32 (hereinafter referred to as a cartridge) is arranged to take up and stow the film 1 therein.

The camera 30 includes a spool driver 34 which is arranged to be driven by a rotating force of a film transport motor 38. When the camera 30 is loaded with the cartridge 32, a spool 35 disposed inside the cartridge 32 is driven to rotate by the rotation of the spool driver 34 in the direction of arrow A. The rotation of the spool 35 causes the leading end (a leader part) of the film 1 to be thrust out from a film exit port 36 of the cartridge 32. Upon arrival of the leading end of the film 1 at a take-up spool 37 disposed inside the camera 30, the film 1 begins to be wound on the take-up spool 37. When the film 1 begins to be wound on the take-up spool 37, the driving force of the film transport motor 38 which has been transmitted to the spool driver 34 is cut off by the action of a known one-way clutch or the like.

The film transport motor 38 is disposed within the take-up spool 37 for reduction in size of the camera 30. A pinion gear 39 is mounted on the output shaft of the film transport motor 38. The rotation of the film transport motor 38 is transmitted to the spool driver 34 through the pinion gear 39 and the one-way clutch or the like to cause the spool driver 34 to rotate in the direction of arrow A in thrusting the film 1 out from the cartridge 32. At the time of winding the film 1 on the take-up spool 37, the rotation of the film transport motor 38 is transmitted to the take-up spool 37 through the pinion gear 39 and a spool gear (not shown) formed integrally with the take-up spool 37 to cause the take-up spool 37 to rotate in the direction of arrow B.

When the film transport motor 38 reversely rotates, the spool driver 34 is driven to rotate in the direction opposite to the direction of arrow A. By this rotation, the film 1 is rewound back into the cartridge 32.

Guide rollers 40 and 41 are arranged to guide the film 1 in such a way as to have the leader part of the film 1 adequately wound around the take-up spool 37. The camera 30 has a photo-taking lens 42. A portion of the film 1 where the film 1 is opposed to the photo-taking lens 42 is indicated as a photo-taking frame F. The center of the photo-taking frame F (a center of the photo-taking lens 42) is indicated by reference symbol 0.

A pressure plate 11 is arranged to ensure the flatness of the film 1 at the time of taking a shot by being in contact with the base surface of the film 1. Two photo-reflectors 44 and 45 are mounted on the pressure plate 11 and spaced in the direction of transporting the film 1. The photo-reflectors 44 and 45 are thus arranged to optically detect perforations P provided in the film 1 while the film 1 is in process of being transported.

Figure 1:
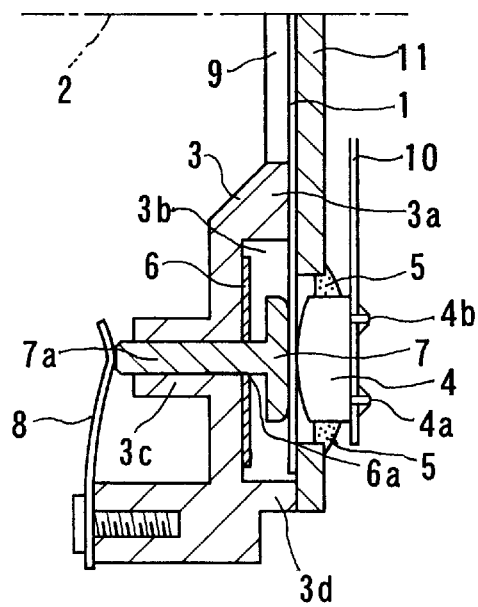
FIG. 1 is a sectional view showing a magnetic head and parts around the magnetic head of a camera according to a first embodiment of the invention.

A magnetic head 4 is arranged to magnetically record and read (reproduce) information on and from a magnetic recording layer which is formed on the base surface of the film 1. The magnetic head 4 has a channel arranged for both recording and reproduction. The body of the magnetic head 4 is formed by winding a reproduction coil and a recording coil around a core. The magnetic head body thus formed is covered with a shield case made of a high permeability material such as permalloy. The magnetic head 4 which is formed in this manner is secured to a cutout part of the pressure plate 11 with an adhesive 5 as shown in FIG. 1. Terminals 4a and 4b which are provided on the rear side of the magnetic head 4 are electrically connected to a flexible circuit board 10.

After completion of a photo-taking (exposure) operation on each of the photo-taking frames F, the film 1 is transported in the direction of arrow C to an extent corresponding to one frame portion thereof when the film transport motor 38 is energized. During this time, the magnetic head 4 magnetically records, on an area other than a photo-taking image plane in the magnetic recording layer, photographic information (a date, time, a title, photo-taking data, etc.) corresponding to the frame through the recording-and-reproducing channel. As a result, a magnetic track T is formed on the film 1.

Further, in a case where the camera is loaded with a cartridge containing a film which has been exposed halfway using only some of frames, the film is pulled out continuously by the take-up spool 37 in the direction of arrow C, after the film is thrust out by the spool driver 34, with the film transport motor 38 energized. In this instance, the magnetic head 4 acts to reproduce, through the recording-and-reproducing channel, the photographic information recorded in the magnetic track T. The magnetic head 4 then outputs signals serially showing whether each frame has already been used for photographing from one frame after another beginning with a leading frame. The reproduction output of the magnetic head 4 is sent to a control circuit (not shown) of the camera. Upon receipt of the reproduction output of the magnetic head 4, the control circuit causes an unused frame, i.e., an unexposed frame, to be set at a photo-taking aperture when the unexposed frame is detected. After that, the process of pulling out the film is brought to a stop.

The reproducing action of the magnetic head 4 is performed only while the film transport motor 38 is energized and is rotating. It is, therefore, necessary to remove the adverse effect of a noise component (a leakage magnetic flux) of the film transport motor 38 on the reproduction output of the magnetic head 4. However, in order to thoroughly remove the adverse effect of the noise component, the use of the shield case provided at the magnetic head 4 alone is insufficient. Besides, since the shield case is provided with an opening for exposing the core of the magnetic head 4, it is impossible to block the noise component from intruding through this aperture part.

In the case of the first embodiment, therefore, the adverse effect of the noise component generated by the film transport motor 38 is reduced first by selecting the location of the magnetic head 4 relative to the film transport motor 38. In FIG. 4, the magnitude of the magnetic noise generated by the film transport motor 38 is qualitatively represented by areas N1 and N2 indicated by one-dot-chain lines. The film transport motor 38 generates the magnetic noise to a maximum degree in the directions of arrows D and to a minimum degree in the directions of arrows E across its rotation axis. The magnetic noise magnitude distribution is almost unvarying in the axial (longitudinal) direction of the film transport motor 38. To minimize the adverse effect of the magnetic noise of the film transport motor 38, the magnetic head 4 is disposed in the directions of arrows E relative to the film transport motor 38.

Further, in the first embodiment, a magnetic shield member 6 is disposed in the vicinity of the magnetic head 4, as shown in FIG. 1. Referring to FIG. 1, there are illustrated a photo-taking optical axis 2 and a camera body 3. The camera body 3 has an aperture 9 formed in the middle part in the film transporting direction. A cartridge loading chamber and a take-up spool housing chamber (not shown) are formed at two ends of the camera body 3 in the direction of film transport. At the lower part of the camera body 3, there are formed an outer rail 3d and an inner rail 3a. A film transport path is defined between the outer rail 3d and the pressure plate 11. The inner rail 3a is arranged to position the film 1 in a focal position by being in sliding contact with a film part which is located on the outer side of each photo-taking frame F but on the inner side of a film part forming the magnetic track T on the film 1 which passes the film transport path. Another pair of outer and inner rails are also formed on the upper part of the camera body 3.

The magnetic shield member 6 is secured to the bottom face of a recessed part 3b of the camera body 3 formed between the outer rail 3d and the inner rail 3a, that is, on the side of the camera body 3 facing the film 1.

A pad 7 is disposed within the recessed part 3b to push the film 1 against the magnetic head 4. The pad 7 is supported in such a manner that a support shaft part 7a thereof is axially movably inserted into a hole formed in a pad support part 3c of the camera body 3. For passing the support shaft part 7a of the pad 7, the magnetic shield member 6 is also provided with a hole 6a which is of about the same size as the sectional area of the support shaft part 7a of the pad 7. The pad 7 is urged to move toward the film 1 by a leaf spring 8 which is secured to a part of the camera body 3 located on the side of the photo-taking lens.

With the camera arranged in this manner, the magnetic shield member 6 is disposed within the recessed part 3b (between the pad 7 and the pad support part 3c) which is a part of the camera body 3 located nearest to the magnetic head 4. Therefore, compared with a case where a magnetic shield member is disposed, for example, on the rear side (on the side of the photo-taking lens) of the recessed part 3b of the camera body 3, the magnetic head 4 can be more effectively shielded from a leakage magnetic flux of the film transport motor 38. Besides, the hole 6a formed in the magnetic shield member 6 is of a minimum size for passing the support shaft part 7a of the pad 7. Therefore, the magnetic shielding effect is never lowered to any considerable degree by the provision of the hole 6a.

Figure 2:
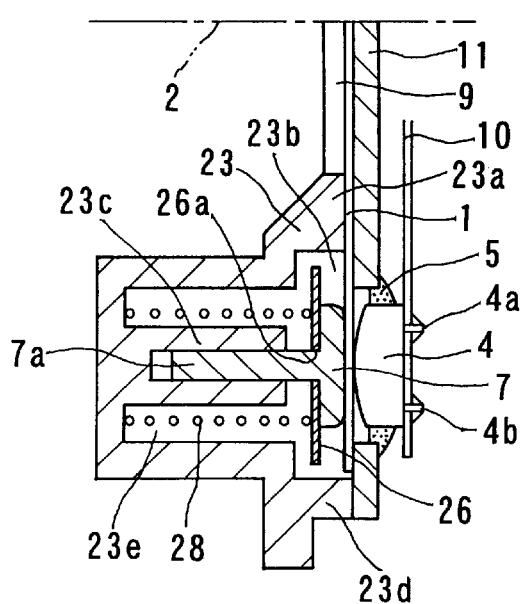
FIG. 2 is a sectional view showing a magnetic head and parts around the magnetic head of a camera according to a second embodiment of the invention.

FIG. 2 is a sectional view showing a magnetic head and parts around the magnetic head of a camera according to a second embodiment of the invention. In the following description, all parts that are the same as those of the first embodiment are indicated by the same reference numerals as those used for the first embodiment.

In FIG. 2, reference numeral 23 denotes a camera body. The camera body 23 has an aperture 9 formed in the middle part in the direction of film transport. A cartridge loading chamber and a take-up spool housing chamber (not shown) are formed at two ends of the camera body 23 in the direction of film transport. At the lower part of the camera body 23, there are formed an outer rail 23d and an inner rail 23a. A film transport path is defined between the outer rail 23d and the pressure plate 11. The inner rail 23a is arranged to position the film 1 in a focal position by being in sliding contact with a film part which is located on the outer side of each photo-taking frame F but on the inner side of a film part forming the magnetic track T on the film 1 which passes the film transport path. Another pair of outer and inner rails are also formed on the upper part of the camera body 23.

A pad 7 is disposed within a recessed part 23b between the outer and inner rails 23d and 23a to push the film 1 against the magnetic head 4. The pad 7 is supported in such a manner that the support shaft part 7a thereof is axially movably inserted into a hole formed in a pad support part 23c of the camera body 23. A magnetic shield member 26 is secured to the rear side of the pad 7, i.e., on one side of the camera body 23 facing the film 1.

The magnetic shield member 26 is provided with a hole 26a which is also for passing the support shaft part 7a and which is of about the same size as the sectional area of the support shaft part 7a. The pad 7 is urged to move toward the film 1 by a coil spring 28 disposed within a cylindrical groove which is formed around the pad support part 23c of the camera body 23.

With the camera arranged in this manner, the magnetic shield member 26 is disposed between the pad 7 and the pad support part 23c on the rear side of the pad 7 at a part of the camera body 23 which is located nearest to the magnetic head 4 among other parts of the camera body 23. Therefore, compared with a case where a magnetic shield member is disposed, for example, at a part of the camera body 23 on the side of the photo-taking lens, the magnetic head 4 can be more effectively shielded from a leakage magnetic flux of the film transport motor 38. Besides, the magnetic shield member 26 is urged toward the magnetic head 4 (toward the film 1) together with the pad 7. Therefore, the magnetic shielding effect can be more effectively attained at a part which is near to the magnetic head 4 than in the case of the first embodiment.

Further, the hole 26a which is formed in the magnetic shield member 26 is of a minimum size necessary for passing the thin support shaft part 7a of the pad 7. The magnetic shielding effect is, therefore, never lowered to any considerable degree by the provision of the hole 26a in the magnetic shield member 26.

Figure 3:
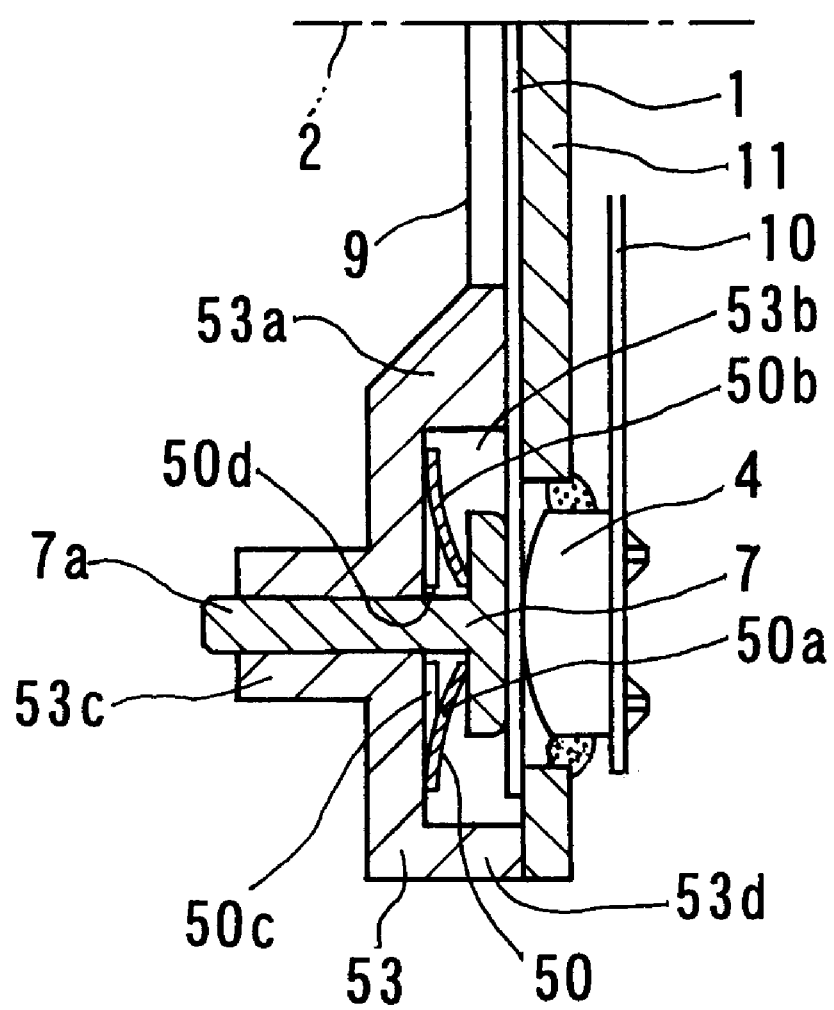
FIG. 3 is a sectional view showing a magnetic head and parts around the magnetic head of a camera according to a third embodiment of the invention.

FIG. 3 is a sectional view showing a magnetic head and parts around the magnetic heads of a camera according to a third embodiment of the invention. In the following description, all parts that are the same as those of the first embodiment are indicated by the same reference numerals as those used for the first embodiment.

In FIG. 3, reference numeral 53 denotes a camera body. The camera body 53 has an aperture 9 formed in the middle part in the direction of film transport. A cartridge loading chamber and a take-up spool housing chamber (not shown) are formed at two ends of the camera body 53 in the direction of film transport. At the lower part of the camera body 53, there are formed an outer rail 53d and an inner rail 53a. A film transport path is defined between the outer rail 53d and the pressure plate 11. The inner rail 53a is arranged to position the film 1 in a focal position by being in sliding contact with a film part which is located on the outer side of each photo-taking frame F but on the inner side of a film part forming the magnetic track T on the film 1 which passes the film transport path. Another pair of outer and inner rails are also formed on the upper part of the camera body 53.

A pad 7 is disposed within a recessed part 53b between the outer and inner rails 53d and 53a to push the film 1 against the magnetic head 4. The pad 7 is supported in such a manner that the support shaft part 7a thereof is axially movably inserted into a hole formed in a pad support part 53c of the camera body 53. A shield-and-spring member 50 which combines the functions of a shield and a spring is secured to the rear side of the pad 7, i.e., on one side of the camera body 53 facing the film 1.

The shield-and-spring member 50 is composed of a base part 50c which is mounted on the bottom face of the recessed part 53b and spring parts 50a and 50b which rise from the base part 50c and are arranged to urge the pad 7 toward the film 1. The base part 50c is provided with a hole 50d which is for passing the support shaft part 7a and which is of about the same size as the sectional area of the support shaft part 7a of the pad 7.

With the camera arranged in this manner, the shield-and-spring member 50 which is a magnetic shield member is disposed between the pad 7 and the pad support part 53c in the recessed part 53b which is located nearest to the magnetic head 4 among other parts of the camera body 53. Therefore, compared with a case where a magnetic shield member is disposed, for example, at a part of the camera body 53 on the side of the photo-taking lens, the magnetic head 4 can be more effectively shielded from a leakage magnetic flux of the film transport motor 38.

Besides, the hole 50d which is formed in the shield-and-spring member 50 is of a minimum size necessary for passing the thin support shaft part 7a of the pad 7. Therefore, the magnetic shielding effect is never lowered to any considerable degree by the provision of the hole 50d in the magnetic shield member 50. Further, the arrangement of the third embodiment for forming the shield member integrally with a spring member effectively permits reduction in number of parts and in number of assembly process as compared with a case where these members are arranged separately from each other.

Figure 5:
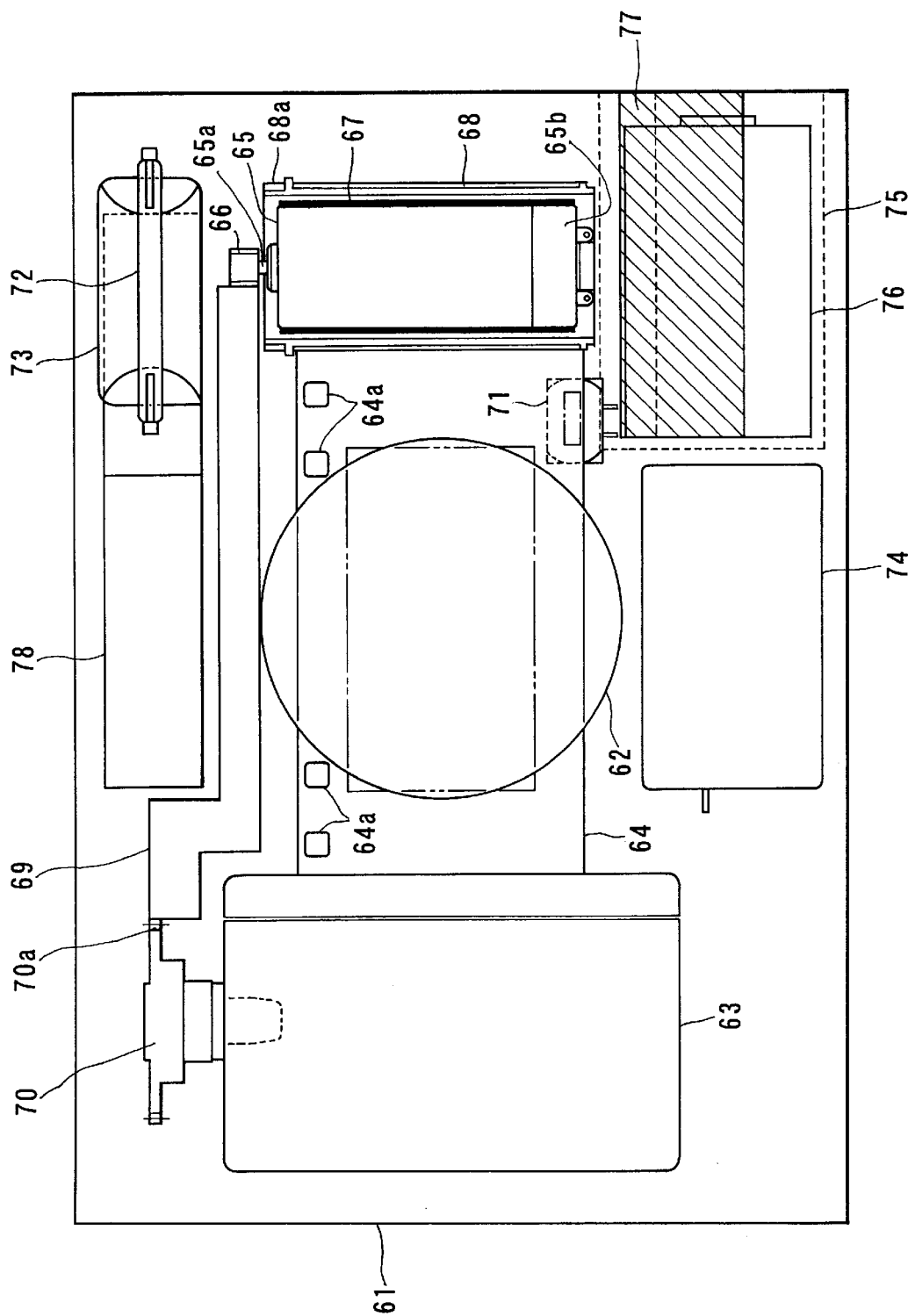
FIG. 5 is a front layout view of a camera according to a fourth embodiment of the invention.
Figure 6:
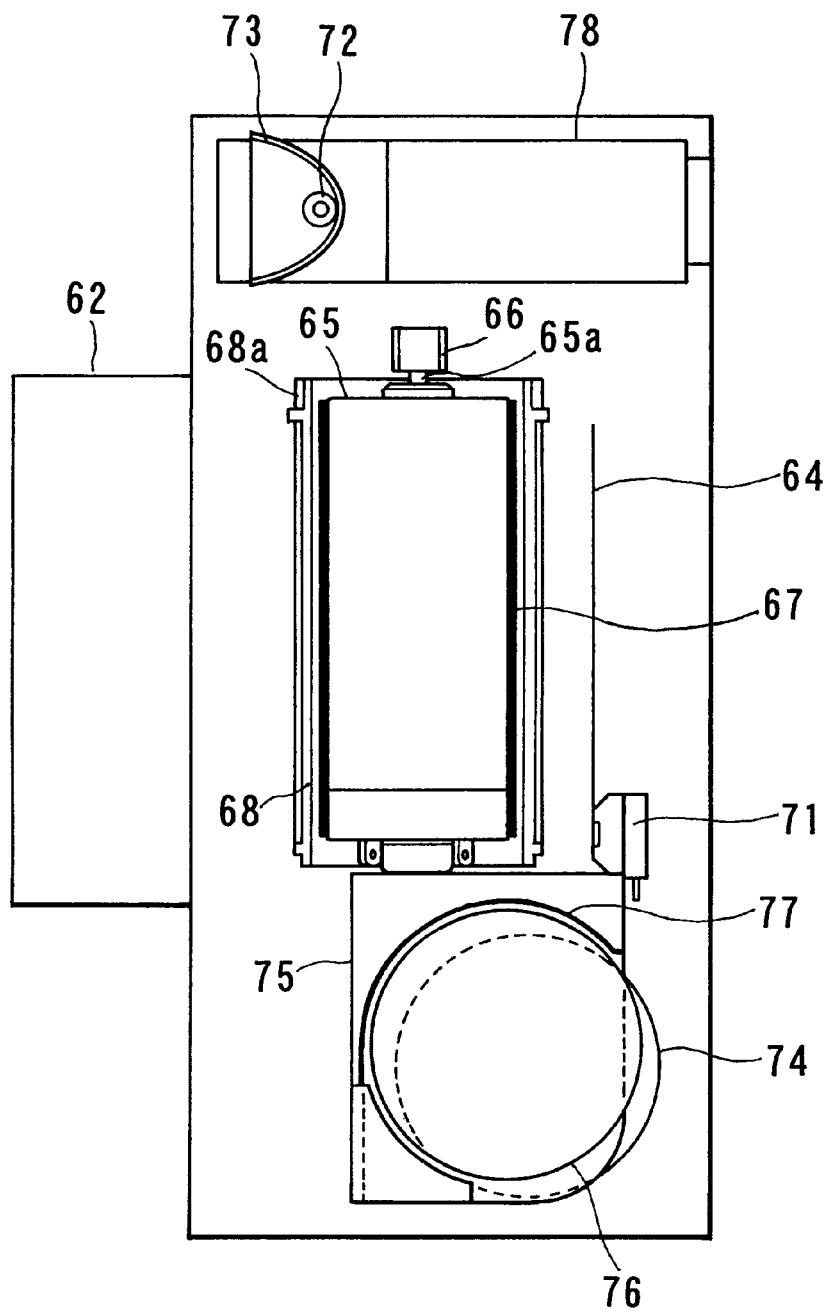
FIG. 6 is a side layout view of the camera according to the fourth embodiment of the invention.

FIGS. 5 and 6 show a fourth embodiment of the invention. FIG. 5 is a layout view showing the camera adapted for use of a film having a magnetic recording part as viewed from the front side thereof. FIG. 6 is a layout view showing the same camera as viewed from one side thereof.

In FIGS. 5 and 6, reference numeral 61 denotes a camera body, and reference numeral 62 denotes a lens barrel including a photo-taking lens. A film cartridge 63 contains therein a film 64 which is of the kind having a magnetic recording part. In the film 64, a magnetic recording layer is formed on one side opposite to an emulsion coating layer where images are to be recorded. Perforations 64a are provided in the film 64 for indexing each frame and for enabling the camera to control the position where the film 64 is to be stopped.

A film transport motor 65 is arranged to be a power source for winding and rewinding the film 64. The film transport motor 65 is provided with an output shaft 65a and a motor cap 65b which is disposed on the terminal side of the film transport motor 65. A pinion gear 66 is arranged to transmit the rotation of the film transport motor 65 to a power transmission system 69. A shield member 67 is provided against a leakage magnetic flux coming from the film transport motor 65. The shield member 67 is made of a soft magnetic iron, a silicon steel or a permalloy material and is formed, for example, by winding a thin plate of such a material around the film transport motor 65 several times or by fitting a tube of such a material on the film transport motor 65.

A film winding spool 68 is provided for taking up the film 64 by winding the film 64 on the spool 68. The film winding spool 68 has a spool gear 68a which is in mesh with a gear (not shown) of the power transmission system 69. The power transmission system 69 is arranged in a known manner to transmit the rotation of the pinion gear 66 to the spool gear 68a or to a fork gear 70 according to the operating sequence of the camera. The fork gear 70 has its one end in mesh with a key part of the film cartridge 63 and is thus arranged to cause, with a force transmitted through the power transmission system 69, the film 64 either to be rewound into the film cartridge 63 or to be thrust out from the cartridge 63. The fork gear 70 is provided with a gear part 70a which is in mesh with the power transmission system 69.

A magnetic head 71 is arranged to be capable of performing writing and reading actions. The writing action is performed to magnetically record photographic data relative to each frame of the film 64 on the film 64 outside of its picture plane while the frame portion of the film 64 is in process of being wound. In a case where a film cartridge taken out from a camera halfway of its use before all the frame portions of the film therein are exposed to light and is loaded again on the camera to use unexposed frame portions, the reading action of the magnetic head 71 is performed to discriminate between exposed frames and unexposed frames by reading and checking each frame for presence or absence of the record of magnetic information, to find up to which of the frames the film has been used, while the film is being transported.

A xenon lamp 72 is arranged to emit a flash light for the camera. A reflector 73 is provided for efficient illumination with the light emitted by the xenon lamp 72. A capacitor 74 is arranged to store energy for the flash light emission.

A battery chamber 75 is arranged to have a battery 76 loaded there as a power source for the camera. As shown in FIG. 6, a magnetic shield member 77 is stuck to the inner wall of the battery chamber 75 in a shape having a curvature corresponding to the curvature of the battery 76. The magnetic shield member 77 is made of a high permeability magnetic material such as a silicon steel, a permalloy material, or the like. The magnetic shield member 77 is thus arranged to readily pass a magnetic flux therethrough. While the magnetic shield member 77 is applied to the inner wall of the battery chamber 75 in the case of the fourth embodiment, the magnetic shield member 77 may be applied to the upper side of the battery chamber 75, instead of the inner wall of the battery chamber 75.

A viewfinder unit 78 is arranged to allow the operator of the camera to decide a picture composition.

Generally, the film transport motor 65 is disposed within the film winding spool 68 for the purpose of reducing the size of the camera. With the film transport motor 65 thus arranged, in the system for performing a magnetic writing action while the film is in process of being wound, the magnetic head 71 is disposed near to the film transport motor 65. Therefore, the size of the film winding spool 68 is limited for arranging a magnetic shield around the film transport motor 65. Further, on the outer tubular part of the film transport motor 65, the cap on its terminal side causes a large leakage magnetic flux therefrom as the cap is made of a plastic material. In the case of the fourth embodiment, the high permeability magnetic material 77 is used at a part of the battery chamber, which is a structural member that is opposed to the terminal of the film transport motor 65 and is not directly related to the film transport motor 65. With the high permeability magnetic material 77 thus arranged to act as a magnetic shield against the terminal side of the film transport motor 65, a magnetic flux leaking from the terminal side (brush side) of the film transport motor 65 is prevented from advancing to the magnetic head 71. The magnetic head 71 is thus effectively shielded from the leakage noise magnetic flux coming from the film transport motor 65.

Figure 7:
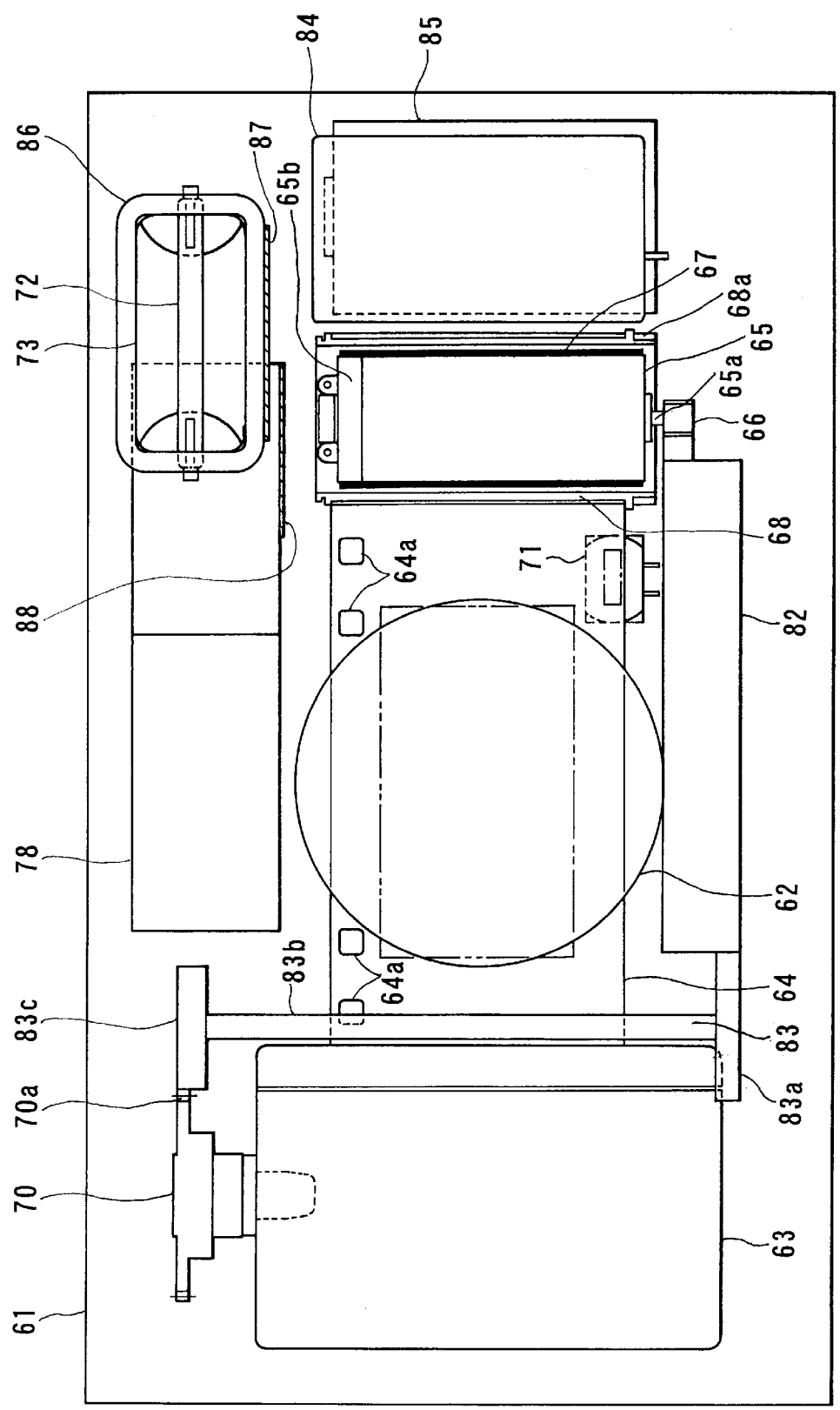
FIG. 7 is a front layout view of a camera according to a fifth embodiment of the invention.

FIG. 7 shows a fifth embodiment of the invention. In FIG. 7, all parts of the fifth embodiment that are the same as those of the fourth embodiment are indicated by the same reference numerals as those used in FIG. 5. Referring to FIG. 7, in the fifth embodiment, the film transport motor 65 of the fourth embodiment is arranged upside down. A film winding spool 68 is provided for taking up the film 64 by winding the film 64 on the spool 68. The film winding spool 68 has a spool gear 68a which is in mesh with a gear (not shown) of a power transmission system 82. The power transmission system 82 is arranged in a known manner to transmit the rotation of a pinion gear 66 to the spool gear 68a or to a fork transmission gear 83 according to the operating sequence of the camera. The fork transmission gear 83 is composed of a lower side gear 83a, a shaft 83b and an upper side gear 83c which are arranged to transmit a power obtained on the lower side of the camera to the upper side of the camera. A capacitor 84 is arranged to store energy necessary for emission of a flash light. A battery 85 which is a power source of the camera is vertically disposed outside the film winding spool 68.

A flash case 86 holds a xenon lamp 72 arranged to emit a flash light and a reflector 73. A flash part magnetic shield member 87 is stuck to the lower side of the flash case 86. A viewfinder part magnetic shield member 88 is stuck to the lower side of a viewfinder unit 78. Each of the shield members 87 and 88 is made of a high permeability magnetic material such as a silicon steel, a permalloy material, or the like and is thus arranged to readily pass a magnetic flux therethrough. While the flash part magnetic shield member 87 and the viewfinder part magnetic shield member 88 are arranged in parallel with each other in the fifth embodiment, this arrangement may be changed to use only one of them.

In the case of the fifth embodiment, the high permeability magnetic materials 87 and 88 are used as magnetic shields respectively at parts of the flash case 86 and the viewfinder unit 78, which are structural members that are opposed to the terminal of the film transport motor 65 and are not directly related to the film transport motor 65. These magnetic shields effectively shield the magnetic head 71 from a leakage noise magnetic flux coming from the film transport motor 65 by acting to prevent the leakage magnetic flux from advancing to the magnetic head 71 from the terminal side (brush side) of the film transport motor 65.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the magnetic head in each of the embodiments disclosed is arranged to record and read magnetic information, the invention applies also to a case where a magnetic head is arranged only to record or to read.

Further, while the embodiments disclosed are arranged to shield the magnetic head from magnetic noise of a film transport motor, the invention is likewise applicable to apparatuses arranged to shield a magnetic head from magnetic noise of other magnetic noise sources, such as a lens driving motor, a battery loaded on the apparatus, a DC/DC converter, a flash device, etc. Such a modification can be made by just replacing the film transport motor in each of the embodiments disclosed with any of these noise sources.

The arrangement of the shield member in each of the embodiments disclosed may be changed as desired. For example, while the magnetic shield member 6 is disposed completely within a space between the outer and inner rails 3d and 3a according to the arrangement of the embodiment disclosed, this arrangement may be changed to cut away the outer rail 3d in part and to have the magnetic shield member 6 to be disposed at least in part between the outer and inner rails 3d and 3a. Further, while the magnetic shield members 77, 87 and 88 are arranged respectively to cover parts of the battery chamber 75, the flash case 86 and the viewfinder unit 78 in the embodiment disclosed, that arrangement may be changed to have the magnetic shield members arranged to cover the whole surfaces of these parts, instead of in part.

The magnetic shield members 77 and 87 which are disposed at the battery chamber 75 and the flash case 86 may be arranged not only to shield the magnetic head from magnetic noise of the film transport motor 65 but also to shield the magnetic head from noise of the battery and the flash unit.

The invention may be carried out by combining as necessary the embodiments or their technological elements described in the foregoing.

The invention applies to cases where either the whole or a part of claims or the arrangement of each embodiment disclosed forms one apparatus or is used in combination with some other apparatus or as a component element of an apparatus.

Further, the invention is applicable to cameras of various kinds, such as a single-lens reflex camera, a lens-shutter type camera, etc., a photo-finishing laboratory apparatus, and all apparatuses adapted for films of the kind having magnetic recording parts, such as a photo-video apparatus, a scanner apparatus, etc.

What is claimed is:

1. An apparatus adapted for a film having a magnetic recording part, comprising:

(A) a magnetic head which at least reads information from the magnetic recording part of the film;

(B) a pad which brings the film close to said magnetic head;

(C) a pad support part which supports said pad; and (D) a magnetic shield member disposed between said pad and said pad support part, said shield member being located to face a surface of said magnetic head and being arranged vertically to an optical axis of said apparatus.

2. An apparatus according to claim 1, wherein said apparatus includes an outer rail part and an inner rail part which forms a travelling path of the film, and wherein said magnetic shield member is disposed at least in part within a space between said outer rail part and said inner rail part.

3. An apparatus according to claim 1, wherein said apparatus includes a pad supporting a shaft part and wherein said magnetic shield member has an opening for passing therethrough said supporting shaft part of said pad.

4. An apparatus according to claim 3, wherein said opening of said magnetic shield member is formed in the same shape as a sectional shape of said supporting shaft part of said pad.

5. An apparatus according to claim 1, wherein said magnetic shield member is fixed to said pad support part.

6. An apparatus according to claim 1, wherein said magnetic shield member is arranged to move together with said pad.

7. An apparatus according to claim 1, wherein said magnetic shield member functions as an elastic member which urges said pad toward said magnetic head.

8. An apparatus according to claim 1, wherein said apparatus includes a camera.

9. An apparatus adapted for a film having a magnetic recording part, comprising:

(A) a magnetic head which at least reads information from a magnetic recording part of the film;

(B) an outer rail part and an inner rail part which forms a travelling path of the film; and (C) a magnetic shield member disposed at least in part within a space between said outer rail part and said inner rail part, said magnetic shield being arranged vertically to an optical axis of said apparatus and to face a surface of said magnetic head.

10. An apparatus according to claim 9, wherein said apparatus includes a camera.

11. An apparatus adapted for a film having a magnetic recording part, comprising:

(A) a magnetic head which at least reads information from a magnetic recording part of the film;

(B) a battery having a terminal; and (C) a magnetic shield member disposed at an interior structural member of said apparatus, said shielding member shielding and surrounding at least part of an outer wall of said battery and being located between said magnetic head and said battery.

12. An apparatus according to claim 11, wherein said apparatus includes a camera.

* * * * *